US008321052B2

(12) United States Patent
Yepez et al.

(10) Patent No.: US 8,321,052 B2
(45) Date of Patent: Nov. 27, 2012

(54) SELF-SERVICE KIOSK WITH MULTIPLE SECURE SERVICE AREAS

(75) Inventors: Rafael Yepez, Duluth, GA (US); Jason A. Mastry, Cumming, GA (US)

(73) Assignee: NCR Corporation, Duluth, GA (US)

( * ) Notice: Subject to any disclaimer, the term of this patent is extended or adjusted under 35 U.S.C. 154(b) by 356 days.

(21) Appl. No.: 12/626,712

(22) Filed: Nov. 27, 2009

(65) Prior Publication Data

US 2011/0130873 A1 Jun. 2, 2011

(51) Int. Cl.
*G06F 17/00* (2006.01)

(52) U.S. Cl. ......................... 700/237; 700/242; 700/244

(58) Field of Classification Search ................... 700/237
See application file for complete search history.

(56) References Cited

U.S. PATENT DOCUMENTS

| | | | | |
|---|---|---|---|---|
| 4,706,794 | A * | 11/1987 | Awane et al. | 700/238 |
| 4,903,815 | A * | 2/1990 | Hirschfeld et al. | 221/88 |
| 4,995,498 | A * | 2/1991 | Menke | 194/205 |
| 4,997,076 | A * | 3/1991 | Hirschfeld et al. | 194/212 |
| 5,172,829 | A * | 12/1992 | Dellicker, Jr. | 221/13 |
| 6,735,497 | B2 * | 5/2004 | Wallace et al. | 700/231 |
| 6,766,218 | B2 * | 7/2004 | Rosenblum | 700/235 |
| 6,766,690 | B2 * | 7/2004 | Tabota | 73/514.34 |
| 7,366,586 | B2 * | 4/2008 | Kaplan et al. | 700/241 |
| 7,689,318 | B2 * | 3/2010 | Draper | 700/236 |
| 7,787,986 | B2 * | 8/2010 | Pinney et al. | 700/232 |

* cited by examiner

*Primary Examiner* — Timothy Waggoner
(74) *Attorney, Agent, or Firm* — Paul W. Martin; Michael Chan

(57) ABSTRACT

A self-service kiosk apparatus is presented that has a plurality of secure service areas. Access to the plurality of secure service areas and the components of the kiosk system contained within each area is controlled. Authorization to access each secure service area is based on a person's level of training and security level.

22 Claims, 5 Drawing Sheets

SELF-SERVICE KIOSK WITH MULTIPLE SECURE SERVICE AREAS

BACKGROUND

Self-service kiosk systems have replaced assisted-service systems in many business environments today. For example, self-service kiosk systems may be found in retail, hospitality, travel, entertainment, medical, pharmaceutical and other environments.

Certain types of self-service kiosk systems dispense and in some cases receive items such as DVDs, rental car keys, hotel room keys, prescription drugs and more. In addition, these types of self-service kiosk systems typically have one or more consumable items such as receipt paper and/or envelopes. The consumable items and dispensable items are maintained securely inside the self-service kiosk system.

The consumable items require periodic replenishing or servicing should a jam occur. Personnel that perform this type of function or service have limited training. The kiosk system is typically opened to allow access to the consumable items. Opening the kiosk system on current systems allows access to the disposable items along with access to other components of the kiosk system. Having access to other items and system components creates an increased security risk plus increases the risk of harm as a result of an untrained person having contact with certain electrical and/or mechanical components within the kiosk system.

Therefore, it would be desirable to provide a self-service kiosk system that provides multiple secure service areas each providing physical access to different areas, items and components inside the self-service kiosk system.

SUMMARY

A self-service kiosk apparatus and method with a plurality of secure service areas is provided.

The self-service kiosk includes a computer that executes software that controls the components and operation of the kiosk. The kiosk has a plurality of secure service areas each containing or providing access to certain items and components of the kiosk. Lockable security devices are used to restrict access to each secure service area.

A method is provided using a computer to input an electronic key with encoded information used to determine which secure service areas can be accessed. The computer powers down components in the accessed secure service areas to reduce the risk of injury.

DETAILED DESCRIPTION

Figure 1:
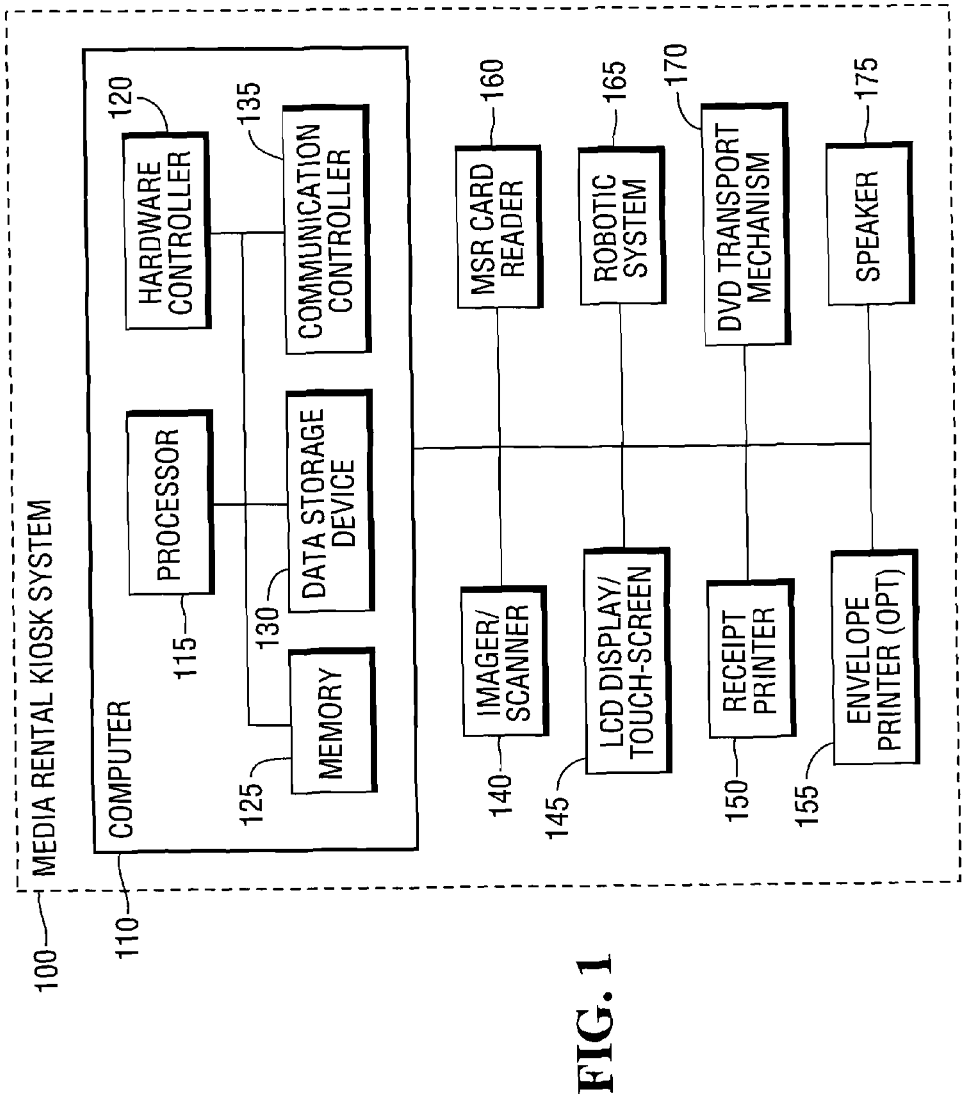
FIG. 1 illustrates a block diagram of an example self-service kiosk apparatus.

Referring now to FIG. 1, there is provided an example DVD media rental kiosk system 100. The kiosk system 100 comprises a computer 110 and a number of peripherals and devices controlled by the computer 110 that together with software applications running on the computer 110 implement and control the features and functions of the kiosk system 100.

The computer 110 comprises a memory 125 that stores instructions and data and a processor 115 that executes the instructions and manipulates the data stored in the memory 125. The computer 110 further comprises a data storage device 130, a communication controller 135 and a hardware controller 120. The data storage device 130 is a permanent or long-term storage that stores instructions and data used by the computer 110. The data storage device 130 can be comprised of solid state devices, i.e., flash memory, or rotating memory, i.e., disk drives or any other suitable device that provides for the non-volatile storing instructions and data. The instructions stored on the data storage device 130 are organized into software applications and programs that control and implement the functions and features of the kiosk system 100. These applications and programs are loaded into the memory 125 and executed by the processor 115. The communication controller 135 provides hardware and software necessary to communicate with peripherals attached to the computer 110 and one or more communication networks. The communication controller 135 can support multiple networks such as Ethernet, WIFI and cellular based networks. The hardware controller 120 controls certain peripherals attached to the computer 110.

The kiosk system 100 also comprises a number of peripherals devices. These include a imager/scanner 140, an magnetic stripe reader (MSR) 160, an LCD display with a touch-screen 145, a robotic device 165, a receipt printer 150, a DVD transport mechanism 170, a envelope printer 155 and a speaker 175. All of these peripherals are controlled by one or more applications executing on the computer 110.

The imager/scanner 140 captures an image of a DVD or scans a bar code on a DVD being dispensed or returned in order to identify the DVD and determine if it is the correct DVD for the requested operation. The imager/scanner can also scan a barcode on a driver's license to verify age, which is required in some states for renting 'R' rated or age restricted content. The imager/scanner can further scan barcodes on promotional coupons. In some embodiments, an RFID reader is used in place of or in addition to the imager/scanner to read an RFID tag attached to a DVD or other items e.g., a driver's license.

The LCD display/touch-screen device 145 is comprised of an LCD display for communicating information to a customer and touch-screen for receiving input from the customer.

The MSR 160 reads a customer's loyalty card or credit card to identify a customer or to perform a transaction e.g., payment fulfillment for renting a DVD. A pin pad maybe included with the MSR 160 or a pin pad can be created virtually on the LCD/touch-screen 145. In some embodiments, the MSR 160 is used to read ID cards used by service personnel. Each ID card contains information that identifies the person and what areas of the kiosk system 100 they are allowed to access. The kiosk system 100 also keeps a record of the access and the person's information. In some embodiments the kiosk system 100 requests conformation for the access from security computer in communication with the kiosk system 100.

The DVD transport mechanism 170 performs two main functions. It receives a DVD from a customer, transports the DVD past the imager/scanner 140 for identification and then delivers the DVD to the robotic device 165 for storage. It can also receive a DVD from the robotic device 165, transport the DVD past the imager/scanner 140 for identification and then deliver it to a customer using the kiosk system 100. Numerous other variations of these functions are also performed by the DVD transport mechanism 170, i.e., returning a DVD to a customer when the DVD cannot be identified.

The robotic device 165 retrieves a DVD from or deposits a DVD into one of multiple secure DVD storage locations located inside the kiosk system 100. The robotic device 165 is also connected to the DVD transport mechanism 170 and either receives a DVD from or delivers a DVD to the DVD transport mechanism 170. An application executed by the computer 110 maintains a record of each DVD stored in the Kiosk system 100 and which storage locations it is stored in. The computer 110, controlled by the application, also causes the robotic device 165 to retrieve a DVD from or store a DVD into the proper storage location.

The receipt printer 150 prints a receipt with details of any transaction that occurs. The receipt printer 150 consumes receipt paper during operation. Periodically, the receipt paper must be replenished which requires internal access to the kiosk system 100. In addition, the receipt paper can become jammed. Clearing the jam can require calling service personnel, which must access the receipt printer 150 to clear the jam.

In some embodiments, an envelope printer 155 is used. The envelope printer 155 prints information on an envelope that is delivered to a customer. Periodically, the envelopes must be replenished which requires internal access to the kiosk system 100. In these embodiments, a customer uses an envelope to transport and protect bare disc delivered by the kiosk system 100.

The speaker 175 provides audio communications to a customer and sounds an alarm when unauthorized entry to a secured area is detected.

In addition to the components depicted in FIG. 1, the kiosk system 100 can house more that a hundred DVDs waiting to be rented or sold. At anytime, there could be thousands of dollars worth of DVDs in the kiosk system 100 in addition to the value of the components that make up the kiosk system 100. The components also present a potential electrical and/or mechanical hazard to anyone accessing the internal areas of the kiosk system 100. Furthermore, a person that has access to the internal area of the kiosk system 100 may only be trained to perform limited functions, such as replacing the consumables, and thus could either be injured and/or cause damage to the components or items if they accessed areas they are not trained for. Finally, not all persons that have access to the kiosk system 100 have the same level of security or truth. There is usually a cost associated with higher levels of security or higher levels of training. Therefore access to different areas of the kiosk system 100 is based on the person's level of security and/or training. This allows a person with a lower level of security and/or training to access only the areas that match their security and/or training and thus lowers the operating cost of the kiosk system 100. It also better protects the person and kiosk system 100 from harm.

Figure 2:
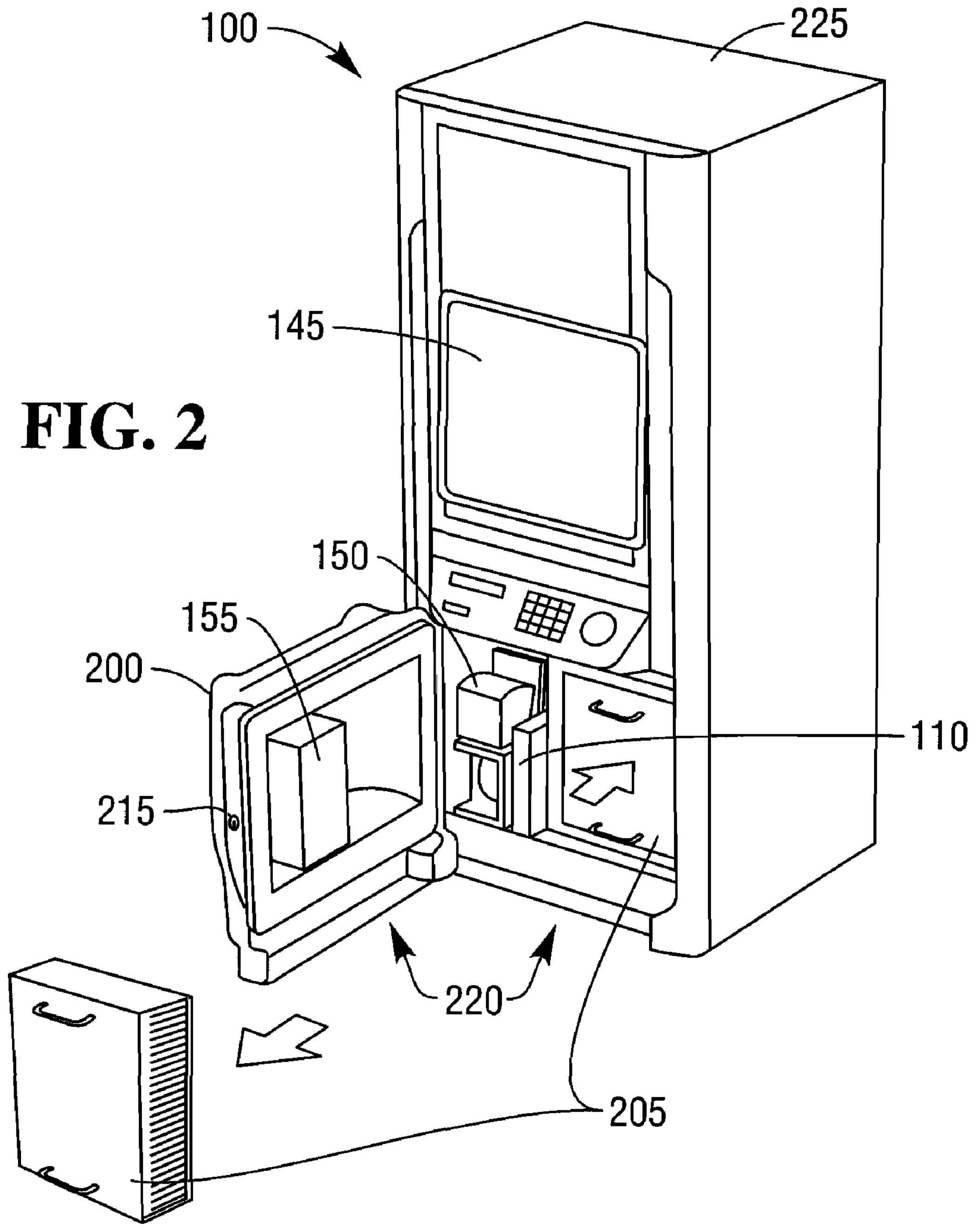
FIG. 2 illustrates a high level drawing of an example self-service kiosk apparatus depicting one of the secure service areas.

The kiosk system 100 has three separate internal secure service areas located within a housing 225 (FIG. 2). Human access to each of the secure service areas is controlled. Kiosk system 100 components accessible from each area all have a similar requirement for a certain level of security and training.

Turning now to FIG. 2, there is provided a drawing of the kiosk system 100 depicting a first secure service area 220. The first secure service area 220 is located behind a lower door assembly 200. Access to the first secure service area 220 is gained by unlocking mechanical key lock 215 and opening the lower door assembly 200. The first secure service area 220 requires the lowest level of security and training for a person accessing the area. The first secure service area 220 permits access to and replacement of the consumables items used by the kiosk system 100. These items include receipt paper and envelopes. If a jam involving a consumable occurs, the jam can be accessed and cleared from the first secure service area 220. The jam may involve the receipt printer 150 or envelope printer 155 which are accessible from the first secure service area 220. In some embodiments, a removable media storage bin 205, used for quick DVD returns, is also accessible from the first area 220.

Figure 3:
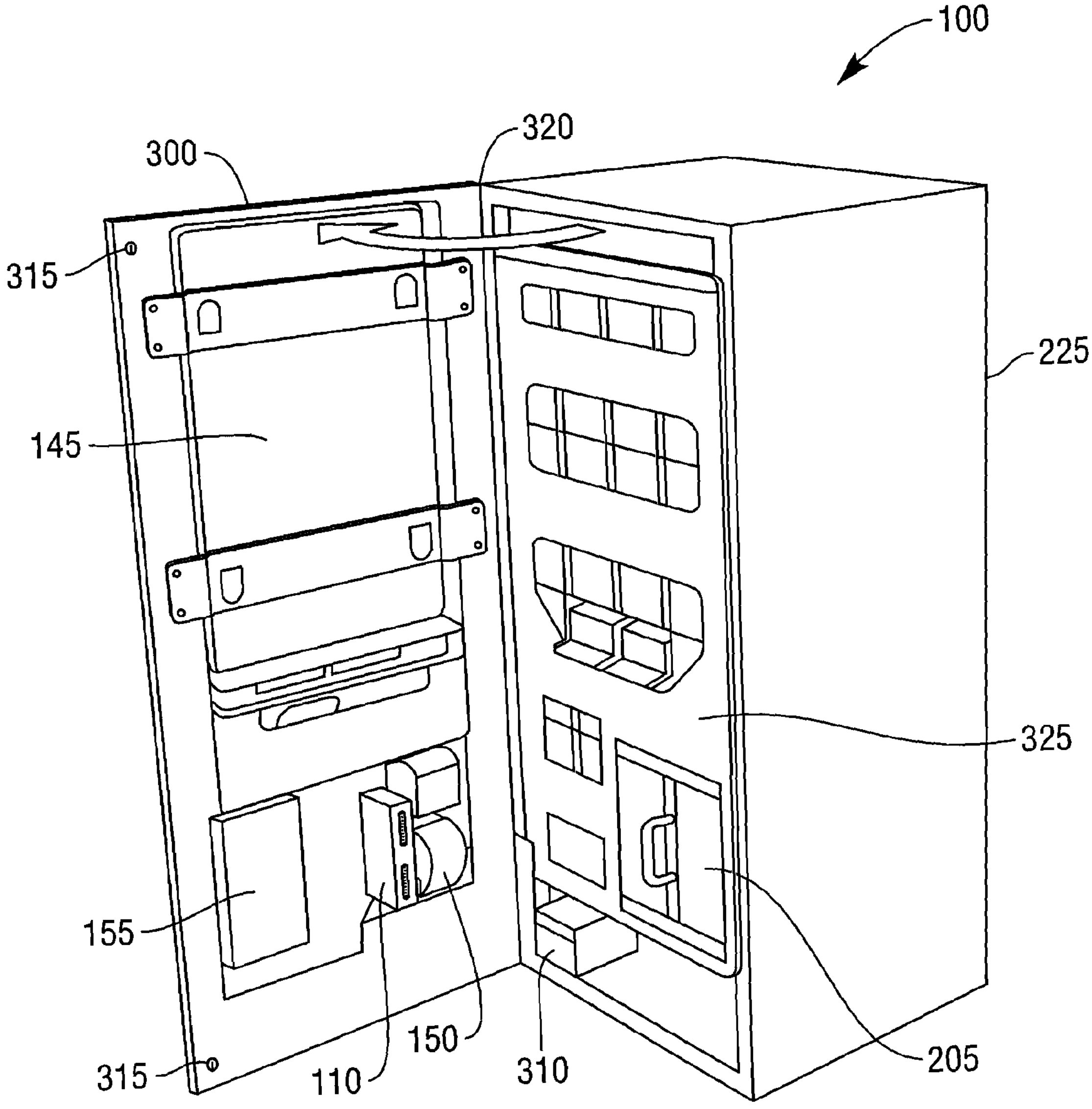
FIG. 3 illustrates a high level drawing of an example self-service kiosk apparatus depicting another of the secure service areas.

Turning now to FIG. 3, there is provided a drawing of the kiosk system 100 depicting a second secure service area 325. It is typical to require a person that has access to the second secure service area 325 to have a higher level of security and training than what is required for the first secure service area 220. This is because the components in the second secure service area 220 are more complex, expensive and pose a higher risk of harm to the person. The second secure service area 325 permits access to the computer 110 and most of the peripherals with the exception of the robotic device 160, DVD storage area and the DVDs. Access to the second secure service area 325 also allows access to the MSR 160 connections and potentially to payment information so a higher level of trust is required. In some embodiments, additional power suppliers and adapters 310 are also accessible from the second service area 325.

The second secure service area 325 is located behind a front panel door assembly 300. Access to the second secure service area 325 is gained by unlocking two mechanical key locks 315 and opening the front panel door assembly 300. The front panel door assembly 300 has a door hinge 320 on the left side that is attached to the housing 225 and the door assembly 300 opens on its right side. The two key locks 315 are keyed to use the same individual key. However, the two key locks 315 for the door assembly 300 and the key lock 215 for the lower door assembly 200 use different individual keys.

In some embodiments, the individual key used for the two key locks 315 on the front panel door assembly 300 will also work to open the key lock 215 on the lower door assembly 200. However, the individual key for the key lock 215 on the lower door assembly 200 will not work to open the two key locks 315 on the front panel door assembly 300.

Figure 4:
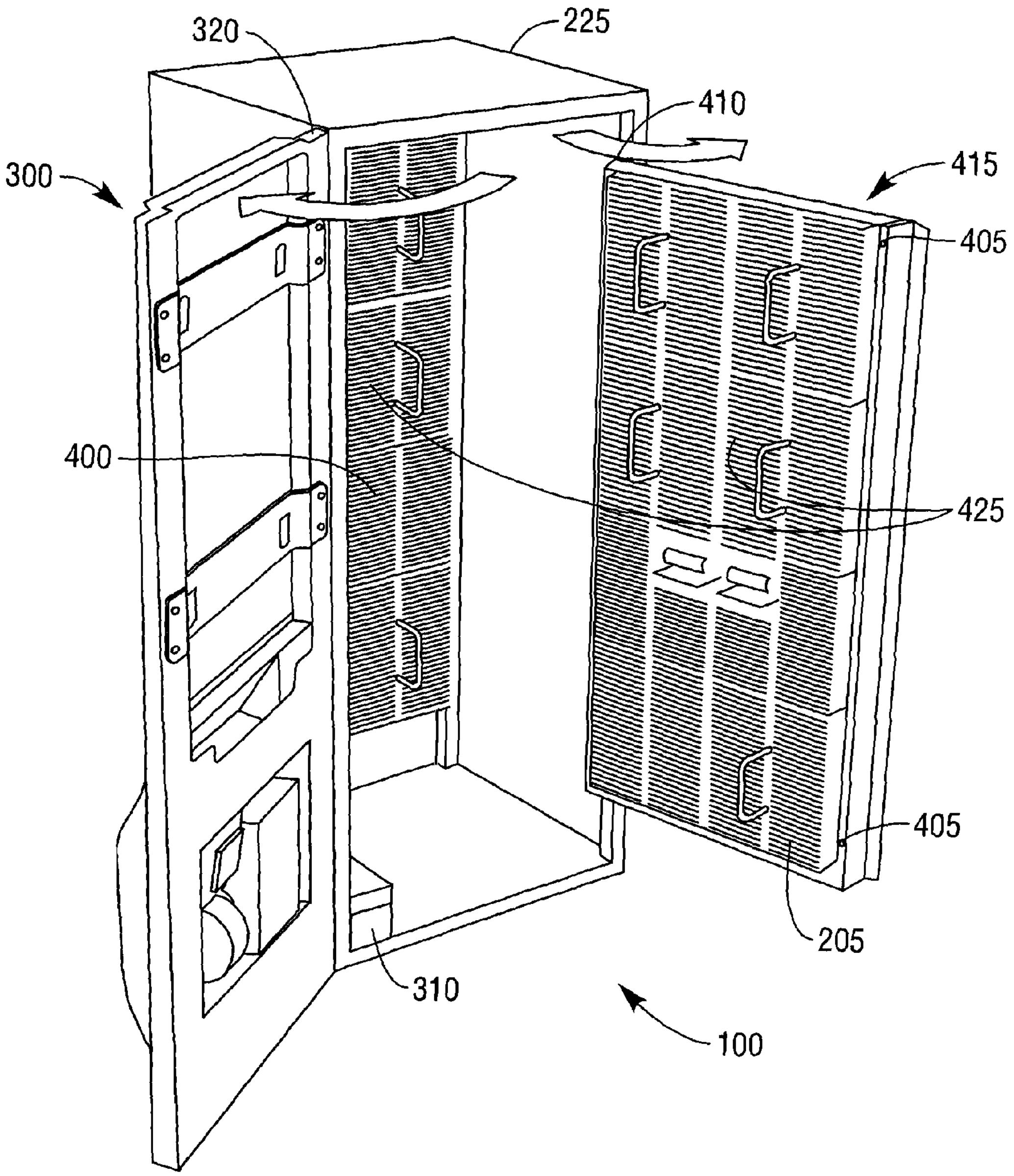
FIG. 4 illustrates a high level drawing of an example self-service kiosk apparatus depicting another of the secure service areas.

Turning now to FIG. 4, there is provided a drawing of the kiosk system 100 depicting a third secure service area 400. In general, access to the third service area 400 requires a different, usually higher, level of security and training because access to this area usually implies access to the above described areas plus the components and items in the third secure service area 400. The third secure service area 400 is located behind a media storage door 415. Access to the third secure service area 400 is gained by unlocking two key locks 405 located on the media storage door 415 and opening the media storage door 415. The media storage door 415 has a hinge 410 on the right side that is attached to the housing 225 and opens from the left side. The two key locks 405 are keyed to use the same individual key. The individual key for the two key locks 405 is different from the individual keys that open the locks for access to the other two secure service areas.

In some embodiments, the individual key used for the two key locks 405 on the media storage door 415 will also work to open the two key locks 315 on the front panel door assembly 300 and the key lock 215 on the lower door assembly 200. However, the individual key for the two key locks 315 on the front panel door assembly 300 and for the key lock 215 on the lower door assembly 200 will not work to open the two key locks 405 on the media storage door 415.

The third secure service area 400 includes media storage racks 425, the robotic device 165 (not shown) and when populated, DVDs. The media storage racks 425 have individual bins where each bin stores one or more DVDs or bare discs. The robotic device 165 is used to move the DVDs or discs to and from the individual bins of the media storage racks 425. Access to the third secure service area 400 permits the servicing of the robotic device 165 and the adding or removing DVDs from the media storage racks 425.

Figure 5:
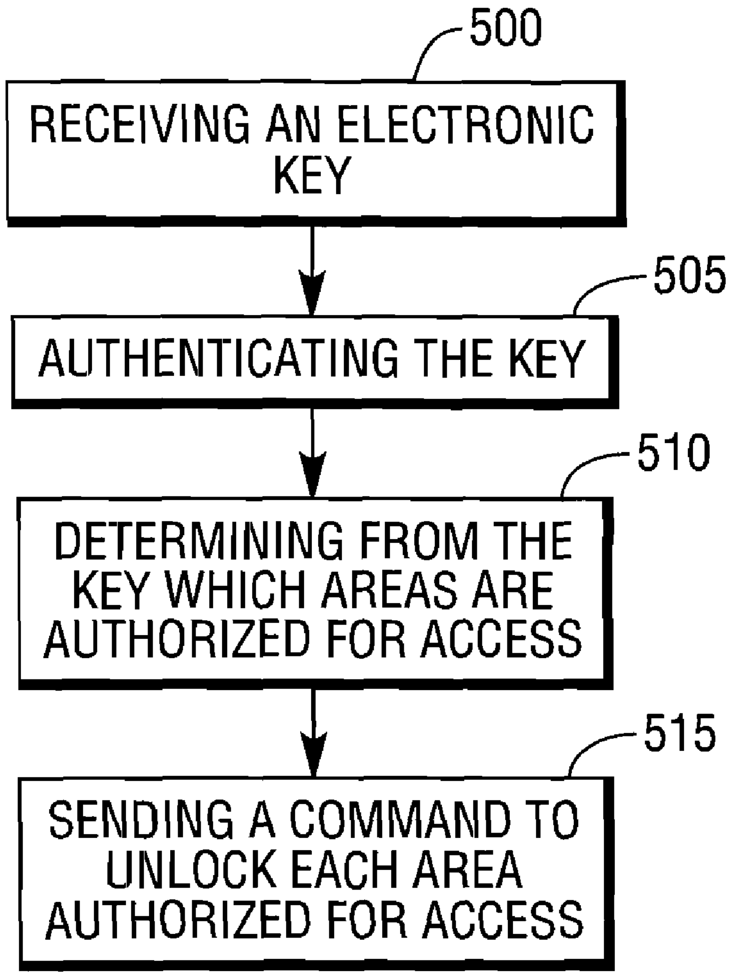
FIG. 5 illustrates a high-level flow diagram for using an electronic lock to access secure service areas.

In some embodiments, an electronic lock is used in place of one or more of the mechanical locks. FIG. 5 illustrates a high-level flow diagram for using an electronic lock to access secure service areas. In step 500, an electronic key is received by the kiosk system 100 from a person at the kiosk system 100 requesting access to a secure area of the kiosk system 100. The electronic locks maybe operated with an electronic key that is entered on a keypad (e.g., the MSR card reader typically has a pin pad) or encoded on an ID or key card that is read by the kiosk system 100. In some embodiments, an RFID device is used to store the electronic key and the kiosk system 100 is able to read the RFID device to obtain the electronic key.

The computer 110 after reading the electronic key authenticates the key and uses the information encoded in the key to determine which electronic locks to open so the person may gain access to authorized secure service areas (step 505). For authentication, the computer 110 may require that a user enter a pin number. The electronic key is encoded with information that the computer 100 uses to determine which of the secure service areas can be accessed (step 510). After the electronic key is authenticated, the computer 110 sends commands to the proper electronic locks to unlock the doors to the authorized secure service areas (step 515).

In some embodiments, the computer 110 will turn off power to or deactivate components in the authorized secure service areas being accessed to reduce the risk of electrical shock or mechanical injury. This may include turning off power to the entire kiosk system 100. Servicing certain components or diagnosing problems with components may require moving a component under power through normal operating limits or performing normal functions. This may not be possible if the computer 110 turns off power to the component. A service person can enter a code into the computer 110 that instructs the computer 110 override the normal power down features. Additional codes will cause the computer 110 to move components for the purpose of diagnosing problems, testing new components or calibrating components.

The above embodiments and drawings disclose a kiosk system 100 for renting DVDs. In other embodiments, the kiosk systems stores and dispenses other items such as pharmaceuticals, hotel keys, SD cards, USB drives or vehicle keys. In some embodiments, such as a check-in kiosk for renting a car, the vehicle keys are stored in a standard sized carrier to make it easier for the devices within the kiosk that handle the items and move them within the kiosk. In some embodiments, the kiosk will separate the vehicle keys from the carrier prior to delivering the keys external to the kiosk. The carrier is retained internally for reuse.

Although particular reference has been made to certain embodiments, variations and modifications are also envisioned within the spirit and scope of the following claims.

What is claimed is:

1. A self-service kiosk apparatus for storing and dispensing items, the apparatus comprising:

a housing;

a first secure service area within the housing associated with a first physical access security level;

one or more item storage racks within the first secure service area where each item storage rack comprises multiple item storage bins;

a robotic device within the first secure service area where the robotic device transports the items to and from the item storage bins;

a first lockable security device within the housing where the first lockable security device when in a locked position restricts human physical access to the first secure service area and when in a unlocked position allows human physical access by a service person who is other than a customer person to the first secure service area to service components within the first secure service area;

a second secure service area which is different from the first secure service area and which second secure service area is within the housing associated with a second physical access security level which is different from the first physical access security level; and a second lockable security device within the housing where the second lockable security device when in a locked position restricts human physical access to the second secure service area and when in a unlocked position allows human physical access by a service person who is other than a customer person to the second secure service area to service components within the second secure service area; and wherein (i) the first lockable security device controls human physical access to only the first secure service area, (ii) the second lockable security device controls human physical access to only the second secure service area, (iii) the first lockable security device is lockable and unlockable compliant with the first physical access security level, and (iv) the second lockable security device is lockable and unlockable compliant with the second physical access security level.

2. The apparatus of claim 1, wherein the first lockable security device is door.

3. The apparatus of claim 1, wherein the second lockable security device is door.

4. The apparatus of claim 1, wherein the first lockable security device includes a first mechanical lock where the first mechanical lock provides the lockable function for the device.

5. The apparatus of claim 1, wherein the second lockable security device includes a second mechanical lock where the second mechanical lock provides the lockable function for the device.

6. The apparatus of claim 1, wherein the first lockable security device includes a first electronic lock where the first electronic lock provides the lockable function for the device.

7. The apparatus of claim 1, wherein the second lockable security device includes a second electronic lock where the second electronic lock provides the lockable function for the device.

8. The apparatus of claim 1, further comprising:

a third secure service area within the housing associated with a third physical access security level which is different from the first and second physical access security levels; and a third lockable security device within the housing where the third lockable security device when in a locked position restricts human physical access to the third secure service area and when in a unlocked position allows human physical access by a service person who is other than a customer person to the third secure service area to service components within the third secure service area;

wherein (i) the third lockable security device is lockable and unlockable compliant with the third physical access security level, and (ii) the third secure service area is different from the first and second secure service areas.

9. The apparatus of claim 8, wherein the third lockable security device is door.

10. The apparatus of claim 8, wherein the third lockable security device includes a third mechanical lock where the third mechanical lock provides the lockable function for the device.

11. The apparatus of claim 8, wherein the third lockable security device includes a third electronic lock where the third electronic lock provides the lockable function for the device.

12. The apparatus of claim 1, wherein the items are one of (i) DVDs, (ii) keys, and (iii) pharmaceuticals.

13. The apparatus of claim 8, further comprising at least one of (i) a computer in the second secure service area wherein the computer controls the components of the apparatus, (ii) a magnetic card reader, (iii) a receipt printer in the third secure service area, (iv) an envelope printer, and (v) a scanner where the scanner identifies each of the items received or dispensed by the apparatus.

14. A computer implemented method for controlling human physical access to different components within a self-service kiosk system using a plurality of secure service areas associated with different physical access security levels, the method comprising:

receiving from service personnel an electronic key to open a lock which is compliant with one of the different physical access security levels, wherein the electronic key is encoded with information authorizing the service personnel human physical access to one or more of the plurality of secure service areas within the self-service kiosk in accordance with the one physical access security level;

authenticating the electronic key;

determining from the electronic key which of the plurality of secure service areas are authorized for human physical access by the service personnel; and sending a command to unlock each of the plurality of secure service areas authorized for human physical access by the service personnel to allow the service personnel to service components in each unlocked secure service area.

15. The method of claim 14, further comprising turning off power to one or more components located in each unlocked secure service area authorized for human physical access to reduce the risk of electrical shock or mechanical injury while the service personnel are servicing the one or more components located in each unlocked service area.

16. The method of claim 15, further comprising receiving an override code from the service personnel to block the turning off of power to the one or more components located in each unlocked secure service area authorized for human physical access.

17. A computer implemented method for controlling human physical access to different components within a self-service kiosk system using a plurality of secure service areas associated with a plurality of physical access security levels, the method comprising:

receiving from a first service person who is other than a customer person a first key to open a first lock which is compliant with a first one of the plurality of physical access security levels, wherein the key is encoded with information authorizing the first service person human physical access to one or more of the plurality of secure service areas within the self-service kiosk in accordance with the first one of the plurality physical access security levels;

authenticating the first key;

determining from the first key which of the plurality of secure service areas are authorized for human physical access by the first service person;

sending a first command to unlock each of the plurality of secure service areas authorized for human physical access by the first service person to allow the first service person to service components in each unlocked secure service area;

receiving from a second service person who is other than a customer person and who is different from the first service person a second key which is different from the first key to open a second lock which is different from the first lock and which second lock is compliant with a second one of the plurality of physical access security levels, wherein the second key is encoded with information authorizing the second service person human physical access to one or more of the plurality of secure service areas within the self-service kiosk in accordance with the second one of the plurality physical access security levels;

authenticating the second key;

determining from the second key which of the plurality of secure service areas are authorized for human physical access by the second service person; and sending a second command which is different from the first command to unlock each of the plurality of secure service areas authorized for human physical access by the second service person to allow the second service person to service components in each unlocked secure service area.

18. The method of claim 17, wherein each of the first and second keys comprises an electronic key.

19. The method of claim 17, further comprising:

receiving from a third service person who is other than a customer person and who is different from the first and second service persons a third key which is different from the first and second keys to open a third lock which is different from the first and second locks and which third lock is compliant with a third one of the plurality of physical access security levels, wherein the third key is encoded with information authorizing the third service person human physical access to one or more of the plurality of secure service areas within the self-service kiosk in accordance with the third one of the plurality physical access security levels;

authenticating the third key;

determining from the third key which of the plurality of secure service areas are authorized for human physical access by the third service person; and sending a third command which is different from the first and second commands to unlock each of the plurality of secure service areas authorized for human physical access by the third service person to allow the third service person to service components in each unlocked secure service area.

20. The method of claim 19, further comprising turning off power to one or more components located in each unlocked secure service area authorized for human physical access to reduce the risk of electrical shock or mechanical injury while a service person is servicing one or more components located in each unlocked service area.

21. The method of claim 20, further comprising receiving an override code from a service person to block the turning off of power to one or more components located in each unlocked secure service area authorized for human physical access.

22. The method of claim 21, wherein each of the first, second, and third keys comprises an electronic key.

* * * * *